(12) United States Patent
Kipersztok et al.

(10) Patent No.: US 8,510,083 B2
(45) Date of Patent: Aug. 13, 2013

(54) METHOD, APPARATUS AND COMPUTER PROGRAM PRODUCT FOR CONSTRUCTING A DIAGNOSTIC NETWORK MODEL

(75) Inventors: Oscar Kipersztok, Redmond, WA (US); Haiqin Wang, Sammamish, WA (US); Ping Xue, Redmond, WA (US)

(73) Assignee: The Boeing Company, Chicago, IL (US)

( * ) Notice: Subject to any disclaimer, the term of this patent is extended or adjusted under 35 U.S.C. 154(b) by 1894 days.

(21) Appl. No.: 10/631,697

(22) Filed: Jul. 31, 2003

(65) Prior Publication Data
US 2005/0028033 A1    Feb. 3, 2005

(51) Int. Cl.
  *G06F 7/60*    (2006.01)
  *G06F 17/10*   (2006.01)
(52) U.S. Cl.
  USPC .............................................. 703/2; 706/45
(58) Field of Classification Search
  USPC ............................................................ 703/2
  See application file for complete search history.

(56) References Cited

U.S. PATENT DOCUMENTS

| | | | |
|---|---|---|---|
| 6,556,964 B2 | 4/2003 | Haug et al. | |
| 6,574,537 B2 | 6/2003 | Kipersztok et al. | |
| 6,584,456 B1 | 6/2003 | Dom et al. | |
| 6,748,304 B2 * | 6/2004 | Felke et al. | 701/29 |
| 6,829,527 B2 * | 12/2004 | Felke et al. | 701/29 |
| 7,096,210 B1 * | 8/2006 | Kramer et al. | 706/45 |

OTHER PUBLICATIONS

Cathy Chen "Bayesian Serviceability Tool for Diagnosing Complex Medical Imaging Machines" Jan. 2003.*
M. Henrion, *Practical Issues in Constructing a Bayes' Belief Network*, Uncertainty in Artificial Intelligence, vol. 3, pp. 132-139 (1988).
H. Wang et al., *User Interface Tools for Navigation in Conditional Probability Tables and Graphical Elicitation of Probabilities in Bayesian Networks*, Proceedings of the Sixteenth Annual Conference on Uncertainty and Artificial Intelligence (2000).

* cited by examiner

*Primary Examiner* — Saif Alhija
(74) *Attorney, Agent, or Firm* — Alston & Bird LLP

(57) ABSTRACT

A method, apparatus and computer program product are provided for constructing a diagnostic network model in a more efficient and timely manner and with improved consistency. A structured electronic representation of a document is automatically reviewed to identify the symptoms experienced by the complex system, the plurality of components of the complex system and the causal relationships between a failure of the respective components and the occurrence of the various symptoms. Respective probabilities can be associated with the causal relationships between the symptoms and the failure of the various components. A network model, such as a Bayesian network model, may then be automatically constructed to represent the symptoms, the components, the causal relationships between failure of the components and exhibition of the symptoms, and the probabilities of the respective causal relationships.

23 Claims, 10 Drawing Sheets

FAULT ISOLATION MANUAL

801. <u>BLEED TRIP OFF Light On - Fault Isolation</u>

A. Description
       (1) (SDS 36-11-00)
       (2) The BLEED TRIP OFF Light on the overhead panel can come on if either one or both of these conditions occur:
          (a) Precooler outlet temperature gets to 485-500°F (252-260°C)
          (b) AIRPLANES WITH BLEED AIR REGULATORS WITH PART NUMBERS 10-62008-37;
              Pneumatic pressure upstream of the PRSOV gets to the applicable pressure ranges: 170-190 psi.
          (c) AIRPLANES WITH BLEED AIR REGULATORS WITH PART NUMBERS 10-62008-40;
              Pneumatic pressure upstream of the PRSOV gets to the applicable pressure ranges: 210-230 psi.

B. Possible Causes
       (1) High stage valve
       (2) Bleed air regulator, M1180
       (3) Precoolor control valve
       (4) 490°F overtemperature switch, S20 (Engine 1) or S21 (Engine 2)
       (5) Wiring C. Circuit Breakers
       (1) These are the primary circuit breakers related to the fault:
          (a) Circuit Breaker Panel, P6-4:
              1) 6A5    AIR CONDITIONING BLEED AIR VALVE ISLN
              2) 6A6    AIR CONDITIONING BLEED AIR XDCR LEFT
              3) 6A7    AIR CONDITIONING BLEED AIR VALVES L
              4) 6B5    AIR CONDITIONING BLEED AIR PRESS IND

FIG. 2

```xml
<?xml version="1.0" encoding="UTF-8"?>
<?xml-stylesheet type="text/xsl" href="fimstyle.xsl"?>
<! -- Autotagger version $Revision: 15.3 $ $Date: 2001/11/20 15:51:14 $ -->
<FRMFIM spl="81205" model="737-600/700/800/900" oidate=""19970205" revdate="2002021"
<TITLE>COMBINED FAULT REPORTING AND FAULT ISOLATION MANUAL</TITLE>
<CHAPTER chapnbr="36" chg="U" key="F-0000022640" revdate="19980205">
<EFFECT effrg="001999"></EFFECT>
<TITLE>PNEUMATIC</TITLE>
<SECTION chapnbr="36" sectnbr="10" chg="U" key="F-0000022640" revdate="19980205">
<TITLE>SECTION 10 FAULT ISOLATION</TITLE>
<SUBJECT chapnbr="36" sectnbr="10" subjnbr="00" chg="U" key="F-0000022641" GBLK evdat
<TITLE>SUBJECT 00 FAULT ISOLATION</TITLE>
<PBGLK chapnbr="36" sectnbr="10" subjnbr="00" pgblknbr="2" chg="U" key="F-0000022
<EFFECT effrg="401999" efftext="ALL"></EFFECT>
<TITLE>FAULT ISOLATION TASKS</TITLE>
<TASK chapnbr="36" sectnbr="10" subjnbr="00" func="00" seq="801" pgblknbr="2" ch
<EFFECT effrg="401999"></EFFECT>
<TITLE>BLEED TRIP OFF Light On - Fault Isolation</TITLE>
<TOPIC>
<TITLE>Description</TITLE>
<SUBTASK chapnbr="36" sectnbr="10" subjnbr="00" func="800" seq="044" pgblknbr="2"
<EFFECT effrg="40199"></EFFECT>
<LIST1>
<L1ITEM>
<PARA><REFEXT refman="SDS" refloc="36-11-00">(SDS 36-11-00)</REFEXT></PARA></L1IT
<SUBTASK chapnbr="36" sectnbr="10" subjnbr="00" func="800" seq="001" pgblknbr="2"
<EFFECT effrg="401999"></EFFECT>
<LIST1>
<L1ITEM>
<PARA>The BLEED TRIP OFF light on the overhead panel can come on if either one or
<LIST2>
<L2ITEM>
<PARA>Precooler outlet temperature gets to 485-500 deg F (252-260 deg C)</PARA></
<L2ITEM>
<PARA>AIRPLANES WITH BLEED AIR REGULATORS WITH PART NUMBERS 10-62008-37;</PARA>
<PARA>Pneumatic pressure upstream of the PRSOV gets to the applicable pressure ra
<L2ITEM>
<PARA>AIRPLANES WITH BLEED AIR REGULATORS WITH PART NUMBERS 10-62008-40;</PARA>
<PARA>Pneumatic pressure upstream of the PRSOV gets to the applicable pressure ra
<TOPIC>
<TITLE>Possible Causes</TITLE>
<SUBTASK chapnbr="36" sectnbr="10" subjnbr="00" func="800" seq="002" pgblknbr="2"
<EFFECT effrg="401999"></EFFECT>
```

FIG. 3

FAULT ISOLATION/MAINT MANUAL

EICAS MESSAGE "C BLD ISLN VAL", CENTER ISOLATION VALVE LIGHT FAILS TO GO OUT WITH VALVE SELECTED OPEN.

PREREQUISITES

MAKE SURE THESE CIRCUIT BREAKERS ARE CLOSED:
   11S14, 11S15

MAKE SURE THE AIRPLANE IS IN THIS CONFIGURATION:
   ELECTRICAL POWER IS ON (AMM 24-22-00/201)

DESCRIPTION:

THE ISOLATION VALVE IS NOT IN THE COMMANDED POSITION.

POSSIBLE CAUSES:

1. ISOLATION VALVE
2. ELECTRICAL CIRCUIT (OPEN/CLOSED POSITION INDICATION)(WDM 36-11-31).

FAULT ISOLATION:

|1| PUT THE CENTER ISOLATION VALVE SWITCH-LIGHT ON THE P5 PANEL TO THE "OPEN" POSITION.
   WAIT 30 SECONDS.
   OPEN THIS CIRCUIT BREAKER ON THE P11 PANEL:

11S14, CENTER ISOLATION VALVE
  POWER

DISCONNECT CONNECTOR Da18 FROM THE CENTER ISOLATION

N8 →

|11| REPLACE THE CENTER ISOLATION VALVE OPEN INDICATION RELAY, K22, ON THE P36 PANEL (WDM 36-11-31).

FIG. 4

BnetModeler - 36.dsl

File  Edit  Consolidate  View  Window  Help 36.dsl

| ID | Name | State 0 | Stab |
|---|---|---|---|
| Node1 | High stage valve | Failed | Norm |
| Node2 | Bleed air regulator, M1180 | Failed | Norm |
| Node3 | Precooler control valve | Failed | Norm |
| Node4 | 490 deg F overtemperature switch, 520 (Engine 1) or 521 (Engine 2) | Failed | Norm |
| Wiring | Wiring | Failed | Norm |
| FIM_36_10_801 | BLEED TRIP OFF Light On | On | Off |
| Node7 | Pressure regulator and shutoff valve (PRSOV) | Failed | Norm |
| FIM_36_10_802 | Bleed Valve Will Not Close When the Bleed Switches Are Moved to Off, the Engi... | On | Off |
| Node9 | Duct pressure transducer, T405 (Left) or T403 (Right) | Failed | Norm |
| Node10 | Dual duct pressure indicator, N12 | Failed | Norm |
| FIM_36_10_803 | Duct Pressure High, the Engine is the Bleed Source | On | Off |
| Node12 | High stage regulator | Failed | Norm |
| Node13 | Leaky sense lines | Failed | Norm |
| FIM_36_10_804 | Duct Pressure Low, the Engine is the Bleed Source | On | Off |
| Node15 | 450 deg F thermostat | Failed | Norm |
| FIM_36_10_805 | Duct Pressure Xero, the Engine is the Bleed Source | On | Off |
| Node17 | Bleed air isolation valve, V16 | Failed | Norm |
| FIM_36_10_806 | Isolation Valve Does Not Open or Close Properly | On | Off |
| FIM_36_10_807 | Duct pressure, L and R pointers not the same (split) the engine is the bleed source | On | Off |
| Node 20 | Isolation valve | Failed | Norm |
| Node21 | Leaky sense line | Failed | Norm |
| FIM_36_10_808 | Duct pressure, L and R pointers not the same (split) the APU is the bleed source | On | Off |

For Help, press F1

FIG. 6

| BnetModeler - 36.dsl | | | | | | | | _ 🗗 ✕ |
|---|---|---|---|---|---|---|---|---|
| File | Edit | Consolidate | View | Window | Help | | | |

| ID | Name | | | | State 0 |
|---|---|---|---|---|---|
| ⊙ Node3 | APU PROBLEMS. | | | | Failed |
| ⊙ Node4 | WING ANTI-ICE IS ON | | | | Failed |
| ⊙ PRSOV | PRSOV | | | | Failed |
| ⊙ FIM_36_10_XB | An (01 | Change Type | | problem was encountered... | On |
| ⊙ FIM_36_10_XC | An (01 | Rename | Alt+R | blem was encountered by th... | On |
| ⊙ FIM_36_10_XD | (01=L, | Delete | Del | ATION VALVE swith problem... | On |
| ⊙ FIM_36_10_01 | LOOSE | | | with eng running amp bleed... | Failed |
| ⊙ Node9 | BAD HF | Add Parent | ▲ | SENSE LINES AT THE PRV, P... | Failed |
| ⊙ Node10 | BAD PR | Add Child | | INT/TEST, AMM 36-11-07/501) | Failed |
| ⊙ Node11 | BAD PR | Locate Parent | | CTLY)(PRV/PRVC ADJUSTME... | Failed |
| ⊙ Node12 | BAD PR | Locate Child | | HPC ADJUSTMENT/TEST, AM... | Failed |
| ⊙ Node14 | OPEN \ | View Document | Alt+V | Y)(PRSOV ADJUSTMENT/TES... | Failed |
| ⊙ Node15 | LOOSE | | | | Failed |
| ⊙ Node18 | PRSOV | Elicit Probability Distribution | Alt+E | | Failed |
| ⊙ Node41 | BLEED AIR CONTROL CARD OR ELECTRICAL CIRCUIT PROBLEMS. | | | | Failed |
| ⊙ Node30 | BAD PRV (THE PRV WILL NOT OPEN)(PRV/PRVC ADJUSTMENT/TEST, AMM 36-1... | | | | Failed |
| ⊙ Node91 | (01=L, 02=R) eng duct press low at low thrust. Press norm at CRZ thrust and... | | | | On |
| ⊙ FIM_36_10_02 | ELECTRICAL CIRCUIT (OPEN/CLOSED POSITION INDICATION)(WDM 36-11-11,... | | | | Failed |
| ⊙ Node20 | ISOLATION VALVE | | | | Failed |
| ⊙ Node21 | | | | | |

For Help, press F1

FIG. 7

BnetModeler - 36.dsl

File  Edit  Consolidate  View  Window  Help 36.dsl

| ID | Name | State 0 | Stab |
|---|---|---|---|
| Node1 | High stage valve | Failed | Norm |
| Node2 | Bleed air regulator, M1180 | Failed | Norm |
| Node3 | Precooler control valve | Failed | Norm |
| Node4 | 490 deg F overtemperature switch, 520 (Engine 1) or 521 (Engine 2) | Failed | Norm |
| Wiring | Wiring | Failed | Norm |
| FIM_36_10_801 | BLEED TRIP OFF Light On | On | Off |
| Node7 | Pressure regulator and shutoff valve (PRSOV) | Failed | Norm |
| FIM_36_10_802 | Bleed Valve Will Not Close When the Bleed Switches Are Moved to Off, the Engi... | On | Off |
| Node9 | Duct pressure transducer, T405 (Left) or T403 (Right) | Failed | Norm |
| Node10 | Dual duct pressure indicator, N12 | Failed | Norm |
| FIM_36_10_803 | Duct Pressure High, the Engine is the Bleed Source | On | Off |
| Node12 | High stage regulator | Failed | Norm |
| Node13 | Leaky sense lines | Failed | Norm |
| FIM_36_10_804 | Duct Pressure Low, the Engine is the Bleed Source | On | Off |
| Node15 | 450 deg F thermostat | Failed | Norm |
| FIM_36_10_805 | Duct Pressure Xero, the Engine is the Bleed Source | On | Off |
| Node17 | Bleed air isolation valve, V16 | Failed | Norm |
| FIM_36_10_806 | Isolation Valve Does Not Open or Close Properly | On | Off |
| FIM_36_10_807 | Duct pressure, L and R pointers not the same (split) the engine is the bleed source | On | Off |
| Node20 | Isolation valve | Failed | Norm |
| Node21 | Leaky sense line | Failed | Norm |
| FIM_36_10_808 | Duct pressure, L and R pointers not the same (split) the APU is the bleed source | On | Off |

Merge    Alt+M
Delete   Del
Unrelate
Relate

For Help, press F1

FIG. 8

Probability elicitation

I am guiding you through the probability elicitation for the variable you just selected. Please tell me your estimate of the conditional probability in the following question. Click Previous or Next button to continue, click OK button to exit.

─ Question ─

What is the probability of

Isolation Valve Does Not Open or Close Properly=Failed conditioned on

Bleed air isolation valve, V16=Failed
Wiring=Failed

─ Answer ─

It is [0.5]

[Previous] [Next] [OK]

FIG. 9

BnetModeler (DM Reference of Node.F1M_36_10_801:36..xml# 10-801)

File  Edit  Consolidate  View  Window  Help

Task 10-801: BLEED TRIP OFF Light On - Fault Isolation

1. Description
   o (SDS) 36-11-00)
   o The BLEED TRIP OFF light on the overhead panel can come on if either one or both of these conditions occur:
     Precooler outlet temperature gets to 485-500 deg F (252-260 deg C)
     AIRPLANES WITH BLEED AIR REGULATORS WITH PART NUMBERS 10-62008-37:
     Pneumatic pressure upstream of the PRSOV get to the applicable pressure ranges: 170-190 psi.
     AIRPLANES WITH BLEED AIR REGULATORS WITH PART NUMBERS 10-62008-40;
     Pneumatic pressure upstream of the PRSOV gets to the applicable pressure ranges: 210-230 psi.

2. Possible Causes
   High stage valve
   Bleed air regulator, M1180
   Precooler control valve
   490 deg F overtemperature switch, S20 (Engine 1) or S21 (Engine 2)
   Wiring 3. Circuit Breakers
   These are the primary circuit breakers related to the fault:
   Circuit Breaker Panel, P6-4:
      C002596A5 AIR CONDITIONING BLEED AIR VALVE ISLN
      C014706A6 AIR CONDITIONING BLEED AIR XDCR LEFT
      C007966A7 AIR CONDITIONING BLEED AIR VALVES L
      C000776B5 AIR CONDITIONING BLEED AIR PRESS IND
      C014696B6 AIR CONDITIONING BLEED AIR XDCR RIGHT
      C007976B7 AIR CONDITIONING BLEED AIR VALVES R 4. Related Data
   Component Location (Fig. 301)
   Component Location (Fig. 302)
   Pneumatic System Schematic (Fig. 304)
   Troubleshooting Check (Fig. 306)
   (SSM 36-11-11)

FIG. 10

METHOD, APPARATUS AND COMPUTER PROGRAM PRODUCT FOR CONSTRUCTING A DIAGNOSTIC NETWORK MODEL

FIELD OF THE INVENTION

The present invention relates generally to methods, apparatus and computer program products for automated construction of a diagnostic network model from documents, that may be utilized to troubleshoot a complex system, such as an aircraft, to identify one or more components, such as one or more line replaceable units (LRUs) or lower level components, that has failed.

BACKGROUND OF THE INVENTION

Maintenance, including the reliable troubleshooting of complex systems, is a common issue in various industries, especially under time and economic constraints. In the aircraft industry, for example, maintenance of an aircraft is of paramount importance to ensure the continued safe and efficient operation of the aircraft. Aircraft maintenance can occur in several different manners. For example, scheduled maintenance generally includes a number of specific tasks, inspections and repairs that are performed at predetermined intervals. These events are scheduled in advance and rarely result in aircraft schedule interruption. In contrast, unscheduled maintenance is performed as required to maintain the aircraft's allowable minimum airworthiness during intervals between scheduled maintenance. Unscheduled maintenance is usually performed while the aircraft is on the ground between flights. However, unscheduled maintenance may be performed during a scheduled maintenance check if a mechanic identifies a problem that was not anticipated. Minimum ground time between flights is desirable to maximize airplane utilization and to meet the established flight schedules. Therefore, the time allocated to unscheduled maintenance is often limited to the relatively short time that the aircraft is required to be at the gate in order to permit passengers to unload and load, to refuel and to otherwise service the aircraft, all of which may take approximately 20 to 120 minutes on average depending on the aircraft type and route to be flown next. Clearly, if an unscheduled problem arises that cannot be addressed on the ground, the flight will be delayed or cancelled, or a replacement aircraft found. Also, many of the non-critical or deferrable problems are addressed at the end of the day and during the night when there is more time to do so.

As explained below, it is oftentimes difficult to complete the unscheduled maintenance in this timeframe, thereby leading to flight delays and/or cancellations. These flight delays and/or cancellations are extremely costly to an airline, both in terms of actual dollars and in terms of passenger perception. In this regard, an airline typically begins accruing costs related to a flight delay following the first five minutes of a delay, with substantial costs accruing if the flight must be cancelled. Moreover, as all air passengers are aware, airline dispatch reliability is a sensitive parameter that airlines often use to distinguish themselves from their competitors.

Notwithstanding the critical importance of properly performing unscheduled maintenance in both an accurate and timely manner, mechanics who perform the unscheduled maintenance on the flight line face a daunting challenge, given the complexity of an aircraft system. In this regard, in addition to the time pressures described above, these mechanics are generally required to troubleshoot the aircraft based upon a limited amount of information that has been provided by the flight, cabin or maintenance crew or by onboard computers, sensors, maintenance messages or the like. While troubleshooting any system based upon this limited information would be difficult, troubleshooting an aircraft which is an extremely large and complex system comprised of many interconnected subsystems is particularly difficult. In this regard, each subsystem is also typically comprised of many Line Replaceable Units (LRUs) that are designed to be individually replaced. An LRU may be mechanical, such as a valve or a pump; electrical, such as a switch or relay; or electronic, such as an autopilot or a flight management computer. Many LRUs are, in turn, interconnected within a particular system. As such, the symptoms described by flight deck effects or other observations may indicate that more than one LRU can explain the presence of the observed symptoms. At that point, there is ambiguity about which LRU(s) have actually failed. Additional information will be needed to disambiguate between the possibilities.

A mechanic must therefore troubleshoot the problem to one or more suspect LRUs, with the number of LRUs preferably being minimized to prevent an excessive number of LRUs that are functioning properly from being replaced. A mechanic must then decide if the suspect LRU(s) must be immediately repaired or replaced prior to further flight of the aircraft or, if the repair or replacement of such LRU(s) may be safely deferred until the completion of the day's flights for the aircraft in order to avoid further delay of the aircraft. In this regard, a minimum equipment list (MEL) is generally maintained for each model of aircraft. The MEL indicates which components must be functioning properly in order for the aircraft to be cleared for takeoff. As such, a mechanic generally determines if any of the suspect LRUs are on the MEL and, if so, must repair or replace each suspect LRU that is on the MEL. If a suspect LRU must be immediately replaced, the mechanic removes the LRU, obtains a replacement LRU and installs the replacement LRU. If the subsystem is capable of being tested while the aircraft is on the ground, the mechanic then generally tests the subsystem to insure that the problem is corrected by the replacement LRU. Unfortunately, the more ambiguity there is between the suspect LRUs, the more difficult it is to single out the truly faulty LRUs and the more prone a mechanic is to want to replace all suspect parts, rather than continue to troubleshoot to disambiguate and narrow the field of suspect LRUs.

Following departure of the aircraft, the LRUs that have been removed are generally tested to determine if the LRUs are defective and, if so, which component(s) of the LRU failed. These tests frequently determine that many of the LRUs that are replaced are actually functioning properly. However, a mechanic, in his/her haste to return an aircraft to service, may skip tests that are necessary to refine the troubleshooting from a handful of suspect LRUs to a specific one or two suspect LRUs since the time required for the tests may cause the upcoming flight to be delayed or cancelled. As will be apparent, however, the replacement of LRUs that are actually functioning properly increases the costs to maintain the aircraft, both in terms of the cost of the parts and the labor. Additionally, the replacement of LRUs that are functioning properly may cause an excessive number of LRUs to be maintained in inventory, thereby also increasing inventory costs associated with the maintenance of the aircraft. As such, it would be desirable to improve the diagnosis ability and knowledge of ground crew mechanics and their ability to make decisions about how to streamline the diagnostic decision making process, i.e., by having a good understanding of the most cost effective and informative actions to take under various different circumstances.

A mechanic may be notified of a problem with an aircraft either while the aircraft is still in route or once the aircraft has landed. If a mechanic is notified while the aircraft is in route, the mechanic is provided with a description of the problems and other observations or symptoms noted by the flight or cabin crew, i.e., flight deck effects, so that the mechanic can begin the troubleshooting process prior to the arrival of the aircraft at the gate, thereby somewhat reducing any delays associated with the repair. More commonly, however, a mechanic is notified once the aircraft arrives at the gate that a problem has been identified by the flight, cabin or maintenance crew and is provided with a list of any observations or symptoms noted by the crew. In some instances, the mechanic may be able to obtain additional information related to the problem from various onboard computers, sensors or the like.

In a few instances involving common or repeated problems, an experienced mechanic may be able to immediately identify the suspect LRU based only upon the problem and the accompanying symptoms. Normally, however, the mechanic must work through a fairly complicated troubleshooting procedure which attempts to identify the suspect LRU(s) based upon the problem and the accompanying symptoms and, in many instances, based upon the results of one or more additional tests that are performed in an attempt to isolate the suspect LRU.

Since the aircraft includes a large number of interconnected systems containing LRUs, and since the propagation of any fault through the system is equally complex, fault isolation manuals (FIMs) have been developed for a number of different aircraft models to guide a mechanic through the troubleshooting process. Similarly, airline maintenance manuals (AMMs) have been developed that include guidance for a mechanic through troubleshooting processes. Unfortunately, these manuals are voluminous, and oftentimes include a number of supplements or updates that must be cross-referenced in order to appropriately troubleshoot the aircraft. Thus, it is a daunting task to quickly browse through the documents and locate the most relevant information in a timely manner. Further, these manuals are oftentimes maintained in a central repository or technical library at the airport and are not immediately available to a mechanic who is repairing an aircraft at the gate. As such, a mechanic must sometimes copy the pages of the manual that seem to be most relevant and proceed to the gate to repair the aircraft. If, however, the troubleshooting process proceeds in a manner not anticipated by the mechanic, the mechanic may have to return to the library to reference or copy additional pages of the manuals, thereby further slowing the troubleshooting process. As such, portable electronic maintenance aids have been developed in order to maintain a portable library of maintenance documents for mechanics. However, it would be desirable to provide still additional information to the mechanic at the gate to facilitate the troubleshooting process.

Even with the appropriate manuals to guide the troubleshooting process, a mechanic may have difficulty troubleshooting a problem and may need to contact a representative of the aircraft manufacturer for more assistance or information regarding the latest updates, thereby further delaying the troubleshooting process. In addition, experienced mechanics oftentimes know tricks of the trade or other unwritten rules which greatly expedite the troubleshooting process, especially in instances in which the faults are multiple, intermittent, repeating or cross-system in nature or in instances in which problems with one LRU are actually attributable to another faulty LRU that is connected, directly or indirectly, to the LRU experiencing the problem. As such, it would be desirable to provide all mechanics with the knowledge and information including the tricks-of-the-trade and the other unwritten rules that have been developed over the years by experienced mechanics to streamline the troubleshooting process.

Once the mechanic identifies one or more suspect LRUs, the mechanic determines if the LRUs are to be repaired or replaced. If the aircraft has completed its operations for the day, the mechanic typically determines if the LRU can be repaired or should be replaced. If the LRU is to be replaced, the mechanic determines if replacement LRUs are available in inventory. This determination generally involves the mechanic's review of a listing of the LRUs in inventory. If the LRUs that are to be replaced are in inventory, the mechanic obtains the necessary LRUs and replaces the suspect LRUs with LRUs from inventory. If, however, the aircraft has additional flights scheduled for later in the day, the mechanic generally determines if the suspect LRU(s) are necessary for continued operation of the aircraft by consulting a minimum equipment list (MEL). If the MEL indicates that the LRU is necessary for continued operation of the aircraft, the mechanic continues, as described above, by determining if the LRU can be repaired and, if not, by determining if the LRU is available in inventory and, if so, obtaining a replacement LRU and swapping the replacement LRU for the suspect LRU. However, if the MEL indicates that the LRU is not necessary for continued operation of the aircraft, the mechanic may defer replacement of the suspect LRU until completion of the operations of the aircraft for the day in order to prevent further delay or cancellation of the aircraft's remaining flights.

As will be apparent, aircraft maintenance is of critical importance for a number of reasons. Moreover, the performance of aircraft maintenance, especially unscheduled maintenance, in a reliable and timely fashion is desirable in order to minimize any delays or cancellations due to maintenance work. Additionally, it is desirable to fully troubleshoot a problem such that a minimum number of suspect LRUs is replaced in order to reduce the maintenance costs and to permit inventory to be more closely controlled. As described above, maintenance operations, especially unscheduled maintenance operations, include a very complicated troubleshooting process which oftentimes requires a mechanic to reference one or more manuals that outline the process and, even if performed correctly, may require an aircraft to be on the ground in repair for an undesirably long period of time.

In order to address at least some of these shortcomings with conventional maintenance operations, an improved diagnostic system and method for identifying the faulty components of an aircraft or any of a wide variety of other complex systems was developed as described by U.S. Pat. No. 6,574,537 which issued Jun. 3, 2003 to Oscar Kipersztok et al., the contents of which are incorporated in their entirety herein. The improved diagnostic system includes an interface for receiving inputs relating to observed symptoms indicative of one or more failed components. The diagnostic system also includes a processing element for correlating the inputs relating to the observed symptoms with at least one suspect component that is capable of causing the observed symptoms upon failure. The diagnostic system further includes a display for presenting information to the user relating to the suspect component(s). The processing element preferably correlates the input relating to the observed symptoms with the suspect component(s) in accordance with a diagnostic model, such as a Bayesian network model, that is constructed using systemic information relating to the components and their input-output relationships, experiential information relating to direct relationships between component failures and the observed symptoms, and factual information relating to component reliability. As such, the processing element includes a number of the tricks of the trade and unwritten rules known by the most experienced mechanics to permit the diagnostic system to perform the troubleshooting process in the most efficient manner.

A diagnostic model, such as a Bayesian network, includes a plurality of nodes interconnected by a number of arcs in a manner defined by the systemic information and the experiential information. The model may include nodes representing the components, the observed symptoms, and tests to be performed to further isolate the problem. Each node representing an LRU (usually root or parentless nodes), has at least two (mutually exclusive and collectively exhaustive) states (e.g., normal or failed) and the diagnostic model assigns a probability to each state of a node based upon estimates that may be derived from component reliability data (factual). If such data are not available, a subject matter expert (SME) may be able to make an educated guess for such estimate based on their systemic, or experiential understanding of the system. Other nodes in the model represent indications or outcomes of tests performed. These are nodes that represent observations of symptoms or test results needed in the process of singling out the failed components causing the problem. Other, intermediate nodes, may represent functional parameters or quantities that describe the system and can help tie the causes (LRU nodes) to the effects (observation nodes) in the model. All nodes that are not root nodes, have states and assigned to the states are probability distributions conditioned on all permutations of the states of the parent nodes. These probabilities can be obtained from data (factual information) or inferred by an expert from systemic or experiential knowledge. Using such a diagnostic model, the processing element can determine the probability of failure for each suspect component, such as each LRU, that may have caused the observed symptoms.

According to U.S. Pat. No. 6,574,537, the processing element correlates the input relating to the observed symptoms with a plurality of components from one or more subsystems that are capable of causing the observed symptoms upon failure. The processing element prioritizes the suspect components based upon the relative likelihood of causing the failure, i.e., that the respective suspect components are causing the observed symptoms to occur. The processing element is also capable of identifying test(s) to be performed in order to refine the prioritization of the suspect components. The display can present a prioritized listing of the plurality of suspect components and a recommendation of the test(s) to be performed in order to refine the prioritization of the plurality of suspect components.

The processing element is preferably capable of prioritizing the tests based upon at least one predetermined criteria. The processing element is also preferably capable of reprioritizing the tests based upon revised criteria. For example, the tests may be prioritized based upon the time required to perform the tests, or the amount of information obtained from the test. Regardless of the manner in which the plurality of tests are prioritized, the processing element is capable of receiving and analyzing data from a test and reprioritizing the suspect components based upon the outcome of the tests.

According to U.S. Pat. No. 6,574,537, the processing element may also be capable of identifying additional information relating to at least one suspect component. Typically, the additional information relates either to component availability, the time to repair or replace the suspect component, or the cost to repair or replace the suspect component. The display also preferably presents the additional information for review by the mechanic. This diagnostic system may therefore include at least one database for storing the additional information. The database can include schematic images of the suspect component that can be displayed during replacement or repair of the suspect component. While displaying the schematic images, the display may also indicate the relative likelihood of component failure. In addition, the database can include a minimum equipment list. The display will then be capable of indicating the respective suspect components that are on the minimum equipment list. With this information, a mechanic can quickly determine if the suspect component must be repaired or replaced or if the repairs can be deferred. The database may include an inventory of components. The display will then be capable of indicating the respective suspect components that are in inventory and therefore available to the mechanic. Similarly, the database can include text descriptions of the suspect components which can also be presented upon the display for review by the mechanic.

In correlating the observed symptoms with one or more suspect components, the processing element may identify suspect components of a plurality of different subsystems, i.e., suspect subsystems. As such, the display may be capable of listing the suspect subsystems and the interface may be capable of receiving input indicative of the respective suspect subsystem to be further analyzed. Based upon this input, the processing element can prioritize suspect components of the selected subsystem and the display can present the prioritized listing of the suspect components of the selected subsystem as described above.

Following completion or deferral of the repair or replacement of the suspect component, the diagnostic system permits the mechanic to record whatever remedial action was taken. In this regard, the interface is capable of receiving data relating to remedial actions undertaken with respect to at least one suspect component. If maintenance actions were deferred, this data may be used to notify others of the need to perform the deferred maintenance. This data can be included within the airplane's maintenance log.

According to U.S. Pat. No. 6,574,537, an improved diagnostic system and method are therefore provided to troubleshoot a complex system, such as an aircraft. The diagnostic system and method permit the suspect components to be reliably identified and to be ranked based upon the probability that a respective suspect component caused the problem. In addition, one or more tests that would be useful to refine the prioritization of the suspect components can be identified. As such, a mechanic can quickly identify components that must be repaired or replaced. By linking to additional information, the mechanic can also quickly determine if the suspect components are on the minimum equipment list and are in inventory, as well as additional information, such as schematics and textual descriptions of the suspect components. The diagnostic system and method of U.S. Pat. No. 6,574,537 should therefore permit troubleshooting to occur more quickly and accurately such that the overall time for repair is reduced which correlates, in the aircraft industry, to a corresponding reduction in the number of flights that are delayed or cancelled due to unscheduled maintenance and a reduction in unnecessary component replacement. By reliably troubleshooting an aircraft, the diagnostic system and method may also insure that a greater percentage of the components that are replaced are actually faulty, thereby decreasing maintenance costs and improving inventory control relative to conventional troubleshooting processes that oftentimes replace components that are still operational. In short, aircraft maintenance and troubleshooting involves complex knowledge and experience as well as complex processes including complex analysis and decision making. Robust and rapid diagnosis provides clear economic advantage and thus increases an airline's competitiveness. A diagnostic system as described by U.S. Pat. No. 6,574,537 not only provides rapid access to the relevant information, but also provides the assistance that facilitates decision making for a proper diagnosis.

The diagnostic model or network utilized by the diagnostic system and method of U.S. Pat. No. 6,574,537 relies upon systemic information and experiential information that are provided by experts in the field. As noted above, the systemic information is typically related to the system components and the input-output relations of the system subcomponents that are connected. With respect to the aircraft industry, for example, the systemic information is typically gathered through interviews with system engineers or the like for the aircraft manufacturer who have significant experience in the design and development of the aircraft and its attendant systems in a relationship of the various subsystems. Likewise, the experiential information that defines the direct relationships between component failures and the observed symptoms is also typically provided by experienced mechanics or engineers who have extensive experience troubleshooting a particular model of aircraft and have a wealth of information relating to the typical types of failures and the symptoms exhibited by an aircraft having each type of failure, including those particularly troubling faults that are multiple, intermittent, repeating or cross-system in nature. This type of knowledge also includes other type of observations such as distinct sounds, smells and visual cues pointing to the presence of a problem, which only can be obtained through years of experience.

Unfortunately, gathering the systemic, experiential and other information that is desired to construct the diagnostic model has been largely a manual process, which can be inconsistent, extremely time-consuming and, in some instances, impractical. First of all, the experts who could provide the systemic, experiential or other information are not always available. Moreover, the information provided by the experts may be somewhat inconsistent. For example, various experts may have had somewhat different experiences with the complex system that is being modeled. Additionally, different experts may express the same or similar concepts in somewhat different terms leading to slightly inconsistent information. Accordingly, while the diagnostic system and method of U.S. Pat. No. 6,574,537 are a significant advance in the art with respect to troubleshooting complex systems to identify one or more components that has failed, the construction of the diagnostic model or network utilized by the diagnostic system and method can be quite time-consuming and expensive and may require the involvement of a number of experts in the field. Accordingly, it would be desirable to develop a diagnostic system, method and computer program product that streamline and optimize the information gathering and model building process, and thus allow consistent and efficient model construction without requiring as much involvement by experts in the field, while still maintaining the accuracy and integrity of the diagnostic model.

SUMMARY OF THE INVENTION

The method, apparatus and computer program product are therefore provided for constructing a diagnostic network model in a more efficient and timely manner and with improved consistency. In this regard, the method, apparatus and computer program product of the present invention rely on the automated analysis of documents that define the plurality of components of a complex system, the various symptoms that may be experienced by the complex system and the causal relationships between a failure of the respective components and the occurrence of the various symptoms. As such, the method, apparatus and computer program product of the present invention significantly reduce the involvement of the experts in the field and leverage the most updated documentation that has already been compiled in conjunction with troubleshooting the complex system, such as an aircraft.

According to the present invention, a structured electronic representation of a document is automatically reviewed to identify the symptoms experienced by the complex system, the plurality of components of the complex system and the causal relationships between a failure of the respective components and the occurrence of the various symptoms. In one embodiment, the structured format of the electronic representation of the document includes a plurality of tags identifying respective fields. These fields may separately include, for example, the various symptoms experienced by the complex system and the plurality of components that are causally related to the various symptoms. Thus, the symptoms, the components and the causal relationships therebetween can be identified based, at least in part, upon the plurality of tags. In a more particular embodiment, the structured electronic representation of the document includes a markup language representation of the document which is then subjected to an automatic review. The documents that are referenced may also contain textual descriptions of the different components and cross-references to other documents containing schematics, wiring diagrams or procedures for testing or replacing a component. The method, apparatus and computer program product of the present invention exploit the specific structured format that each document has, where within each chapter or other defined portion of the document, the information about a particular observed symptom and its possible associated component causes are organized in the same manner. This kind of systematic organization of the document, such as chapter by chapter, makes it possible for the method, apparatus and computer program product of the present invention to fetch the same type of information, systematically, from the same location within a chapter or other defined portion of a document corresponding to the different component causes of a failure, their associated symptoms, the component textual description, and other related information. It should be noted, however, that not all documents are structured the same for different aircraft. For example, a fault isolation manual for one type of aircraft may be structured somewhat differently than the fault isolation manual for another type of aircraft. Within a document for one type of aircraft, however, each chapter or other subdivision is generally structured the same as the other chapters or subdivisions such that predefined types of information may be systemically fetched from the various chapters of the document once the structure of the document is defined. The result is the mapping of these document type objects from the document to a network structure, such as a Bayesian network, that with provisions for a user to add probabilities allows for the construction of a diagnostic network model capable of computing a list of possible causes given the symptoms.

In this regard, respective probabilities can be associated with the causal relationships between the symptoms and the failure of the various components. In this regard, the respective probabilities may be input by an expert in a systemic manner. In addition or alternatively, the respective probabilities may be retrieved from a database, such as a database containing information relating to the reliability of the various components.

A network model, such as a Bayesian network model, may then be automatically constructed to represent the symptoms, the components, the causal relationships between failure of the components and exhibition of the symptoms, and the probabilities of the respective causal relationships. The construction of a diagnostic network model may be performed by a processor executing a computer program product having computer-readable program portions for performing the various functions. As such, the construction of the diagnostic network model can be largely automated in order to increase the efficiency with which the network model is constructed and to reduce inconsistency. Additionally, the method, apparatus and computer program product of this aspect of the present invention can still solicit information from experts to define the relative probabilities of the various causal relationships or the like. Thus, the accuracy of the diagnostic network model may be maintained, while reducing the time expended consulting with experts.

According to another aspect of the present invention, a method, apparatus and computer program product are provided for providing additional information related to one or more components or symptoms of the diagnostic network model. In this regard, at least a portion of a diagnostic network model may be accessed to determine the association between a plurality of components and symptoms based upon the causal relationships therebetween. A representation of the plurality of components and symptoms may be displayed and at least one of the components and symptoms as displayed may be selected. Additional information can then be displayed that is related to the component and/or symptom that is selected. The additional information can be reviewed to further assist in the troubleshooting process of a complex system. The additional information that is displayed may be a portion of the document that was originally automatically reviewed during the construction of the network model.

According to this aspect of the present invention, the diagnostic network model may be further refined. For example, an additional causal relationship may be defined between a symptom and a respective component that has been selected. Likewise, the causal relationship between a symptom and a respective component that has been selected may be deleted. Further, a probability may be associated with the causal relationship between a symptom and a respective component that has been selected. In order to provide additional information, each symptom that is causally related to the failure of a selected component may be displayed. Likewise, each component whose failure is capable of causing a selected symptom may also be displayed.

In order to implement this aspect of the present invention, an apparatus may also be provided that includes a memory device for storing a representation of at least a portion of the diagnostic network model, a display for presenting a representation of the plurality of components and symptoms, and an interface for selecting at least one of the components and symptoms that are displayed. The apparatus of this embodiment also includes a processor, responsive to the interface, for directing the display to present additional information relating to the component and/or symptom that is selected. Typically, the processor operates under the control of a computer program product that includes computer-readable program portions for performing the various functions set forth above.

According to the present invention, a method, apparatus and computer program product are therefore provided for automatically constructing a diagnostic network model based largely upon the definition of a complex system in terms of components, symptoms and the causal relationships therebetween, provided by various documents. By automatically constructing the diagnostic network model in this manner, the diagnostic network model can be constructed more efficiently, both in terms of time and expense, since experts need not be consulted as extensively. Additionally, since the construction of the diagnostic network model is based upon various and generally the most updated documents, the documents may also be utilized to provide additional information regarding the various components and associated symptoms if requested by the user.

BRIEF DESCRIPTION OF THE DRAWINGS

Figure 1:
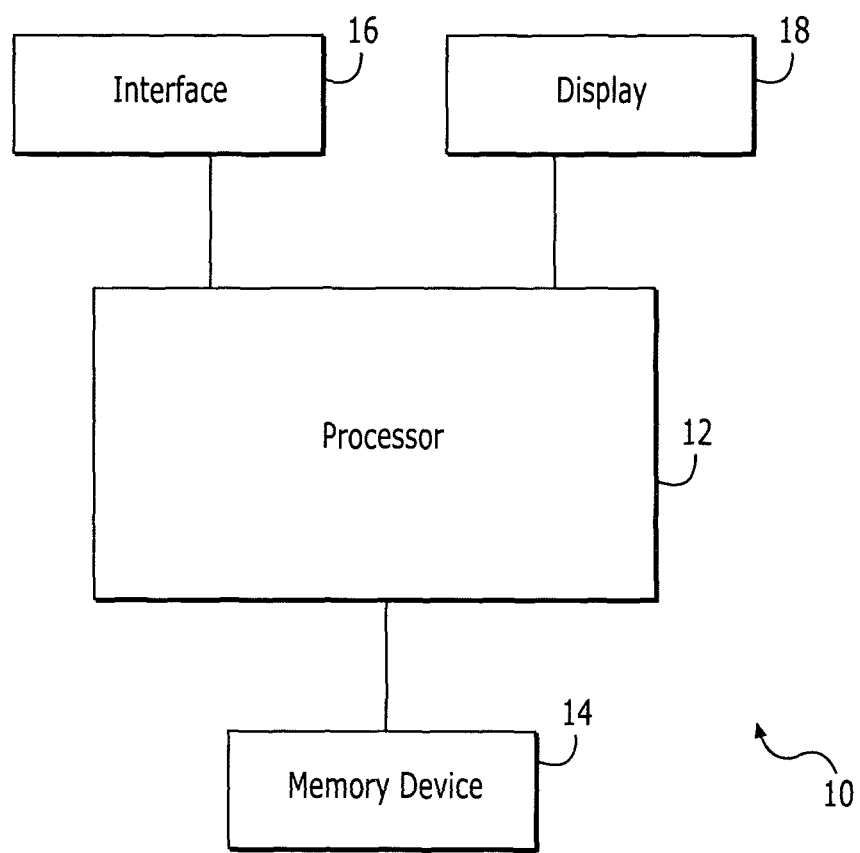
Figure 5:
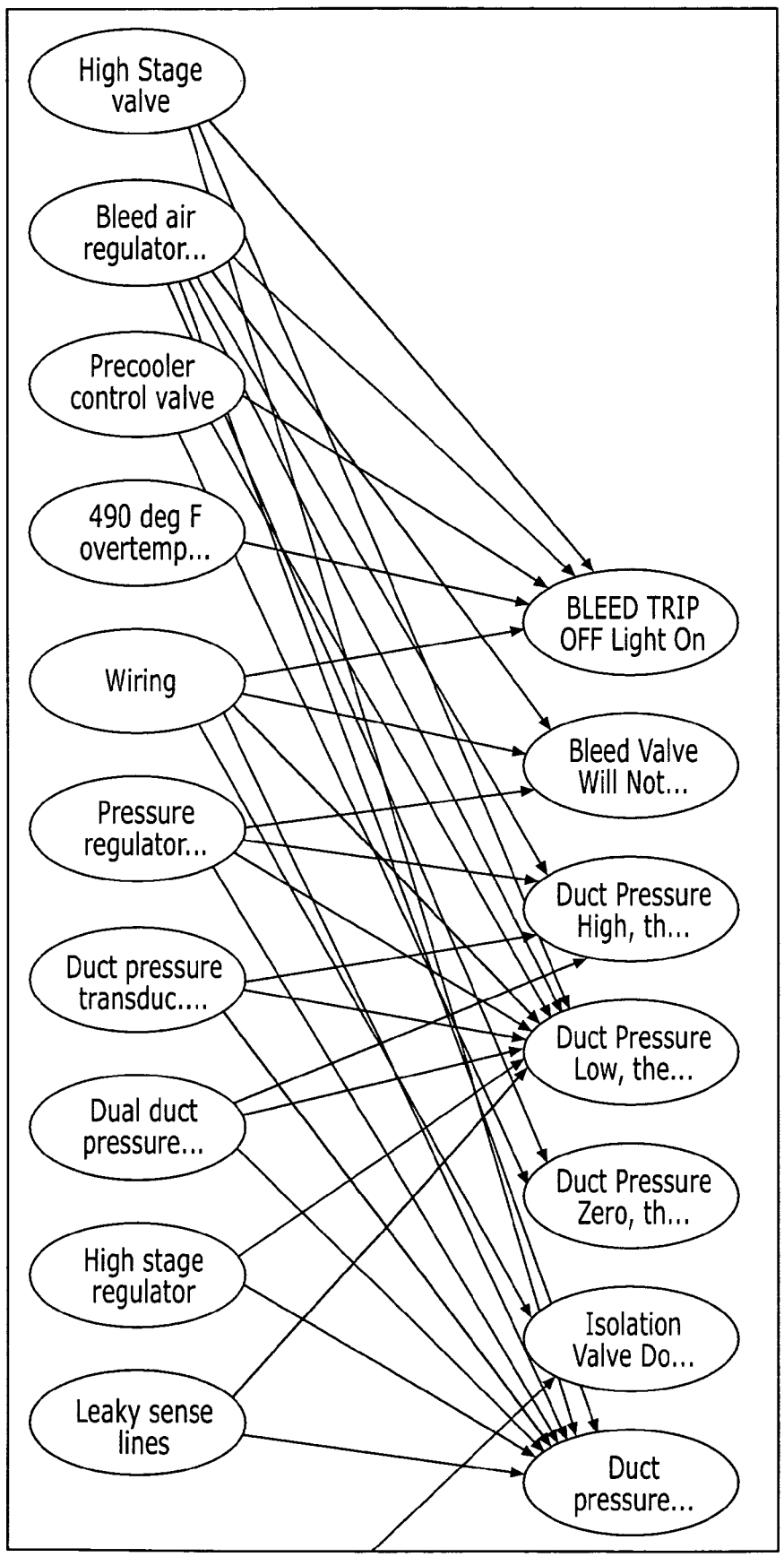

Having thus described the invention in general terms, reference will now be made to the accompanying drawings, which are not necessarily drawn to scale, and wherein:

FIG. 1 is a block diagram of an apparatus for constructing a diagnostic network model according to one embodiment of the present invention;

FIG. 2 is an example of a document from a fault isolation manual that is structured to identify a symptom and a plurality of components whose failure may cause the symptom;

FIG. 3 is an electronic representation of the document of FIG. 2 in XML format;

FIG. 4 is a graphical document from which the text of the document depicted in FIG. 2 may be extracted;

FIG. 5 is a portion of a diagnostic network model, at least some of which is based upon the symptom and the plurality of components causally related to the symptom that were outlined by the document of FIGS. 2-4;

FIG. 6 is a display of the various symptoms and the various components included within a diagnostic network model;

FIGS. 7 and 8 are displays of the symptoms and the components of FIG. 6 in which the various functions that may be selected by a model builder are illustrated;

FIG. 9 is a display in which the probability associated with the occurrence of a symptom in response to a failure of a respective component is elicited; and FIG. 10 is a display depicting at least a portion of a document that is displayed based upon the user's selection of a respective symptom.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to the present invention, an improved method, apparatus and computer program product for constructing a diagnostic network model are provided. Since the diagnostic network model is particularly useful for the aircraft industry, the method, apparatus and computer program product will be hereinafter described and illustrated in conjunction with a diagnostic network model that assists in troubleshooting an aircraft. However, the method, apparatus and computer program product can construct diagnostic network models that can be used to troubleshoot any system having a number of interconnected components, such as the complex systems created by the automotive, marine, electronics, power generation and computer industries.

As shown in FIG. 1, an apparatus 10 for constructing a diagnostic network model according to one embodiment of the present invention is depicted. The apparatus includes a processor 12 for performing the various functions described hereinbelow. The processor is typically comprised of a combination of hardware, such as one or more microprocessors or other processing devices typically embodied by a personal computer, a server computer or other computing device, and software that is stored by memory and executed by the hardware to implement the methodology described herein. However, the processor can be comprised of other combinations of hardware, software, firmware or the like so long as the resulting combination is capable of implementing the methodology described below. The apparatus therefore includes a memory device 14 for providing additional storage including storage of the network model and the various supporting documents that will be subsequently described. The apparatus also generally includes an interface 16 for receiving input. The apparatus can include any interface known to those skilled in the art including a keyboard, a mouse, a trackball, a touch screen or the like. The apparatus further includes a display 18, such as a graphical user interface, for presenting information.

According to the present invention, the processor 12 automatically reviews a structured electronic representation of a document and, more typically, the structured electronic representations of a plurality of documents. With respect to an aircraft, a number of documents have been developed for use by mechanics for troubleshooting various problems onboard an aircraft. In this regard, fault isolation manuals (FIMs), fault reporting manuals (FRMs) and airplane maintenance manuals (AMMs) have all been developed that include detailed information relating to the possible causes of various problems onboard an aircraft. Among other things, these manuals identify the various components that may have caused or otherwise contributed to various symptoms that may be observed aboard the aircraft. The components that are identified by these manuals are typically LRUs that may have failed or lower level components within an LRU or elsewhere that may have failed. Both suspect LRUs, as well as the lower level components, shall be referenced hereinafter as components. The symptoms that are observed in response to the failure of a component may be reported by the flight and cabin crew and recorded in pilot log books, crew reports, maintenance messages or the like. These observed symptoms can come in many forms including flight deck effects and other observations. Flight deck effects include indications provided by various gauges, indicator lights and the like, examples of which will be provided hereinbelow. The observations can include various types of environmental or other information including suspect sounds, vibrations, smells or visual cues observed by the flight, cabin or maintenance crew. Further, the observed symptoms can include the results of tests and/or information provided by various computers, sensors or other equipment onboard the aircraft.

The documents that are reviewed to construct the diagnostic network model generally have a structure, either an explicit structure or some inherent structure. As shown in FIG. 2, by way of example, one page of a fault isolation manual is depicted. As the heading indicates, this page of the fault isolation manual describes a symptom of a particular system, namely, the activation of the bleed trip off light. The activation of this light may be attributable to various causes as identified in subsection B, that being the failure of the high stage valve, the bleed air regulator, the precooler control valve, the 490° F. over temperature switch or the wiring. Thus, this document is structured such that the heading identifies a symptom, while subsection B identifies the components whose failure may cause the symptom. As such, the components identified by the document bear a causal relationship to the symptom. Given that these documents are periodically updated, the ordering of the components, implicitly, implies the some ordering of likelihood of failure for each component, although no number is assigned, evolved over years of feedback from maintainers.

An electronic representation of the structured document is constructed, if one does not already exist. In one embodiment, the structured electronic representation of the document includes a number of tags that identify respective fields. Thus, a first tag may identify the heading of the section as a symptom and a second tag may identify subsection B as the components causally related to the respective symptom. Thus, different tags may identify the symptoms and the components that are causally related to the respective symptoms. The processor can therefore automatically identify the symptoms and the plurality of the components that are causally related to the respective symptoms based, at least in part, upon the plurality of tags. In one embodiment, the structured electronic representation of a document includes a markup language representation of the document. For example, the document may be represented in XML format, SGML format or another markup language. For example, the document of FIG. 2 is shown in XML format in FIG. 3. The markup language format therefore includes various labels, i.e., tags or field designations, that identify the various portions of the document including those portions that identify the symptoms and those portions that identify the plurality of components that are causally related to the respective symptoms.

While FIG. 2 and the foregoing discussion relates to the analysis of a textual document, the symptoms, the components and the causal relationships therebetween may be similarly derived from graphical documents. As shown in FIG. 4, for example, a structured document may initially be provided in a graphical, flow diagram format, such as of a binary tree type that determines the sequential actions that a mechanic should follow in the troubleshooting process. While utilizing Boeing IGRecognizer or a commercially available software applications, the structured graphical document may be converted or translated to a textual document, which contains the textual information in the graphical format and can be used as the textual document depicted in FIG. 2. Once the graphical document is converted to a textual document, the structured textual document can be converted to a format, such as a markup language, that may be automatically reviewed as described above.

Based upon the structure of the electronic representation of the document, the processor 12 automatically reviews the document and automatically identifies the symptoms and the components that are causally related to each symptom, in that the failure of each identified component may cause the occurrence of the respective symptom. Based upon the symptoms, the components and the causal relationships therebetween that are automatically determined from a review of the documents, the processor can construct a diagnostic network model, such as a Bayesian network model. As known to those skilled in the art, the general approach to constructing a Bayesian network for airplane diagnosis is to map the causes of failure to the observed symptoms, as opposed to the normal behavior of the system. While any model building approach known to those skilled in the art can be used, several model building approaches for bayesian networks are described by M. Henrion, *Practical Issues in Constructing a Bayes' Belief Network*, Uncertainty in Artificial Intelligence, Vol. 3, pp. 132-139 (1988), and H. Wang et al., *User Interface Tools for Navigation in Conditional Probability Tables and Graphical*

*Elicitation of Probabilities in Bayesian Networks*, Proceedings of the Sixteenth Annual Conference on Uncertainty and Artificial Intelligence (2000).

The construction of a bayesian network requires the creation of nodes with collectively exhaustive, mutually exclusive discrete states, and influence arcs connecting the nodes in instances in which a relationship exists between the nodes, such as in instances in which the state of a first node, i.e., the parent node, effects the state of a second node, i.e., the child node. In a bayesian network, a probability is associated with each state of a child node, that is, a node that is dependent upon another node. In this regard, the probability of each state of a child node is conditioned upon the respective probability associated with each state of each parent node that relates to the child node.

The nodes of a Bayesian network include both probabilistic and deterministic nodes representative of the components and observed symptoms. The nodes representative of the components and the nodes representative of the observed symptoms are generally the parent nodes and the child nodes, respectively, and are interconnected by influence arcs, either directly or through one or more intermediate nodes. For example, a network fragment for the air conditioning system of a 737-300/400/500 aircraft is shown in FIG. 5. The network fragment include nodes for the air conditioning system components, including the high stage valve, bleed air regulator, precooler control valve, 490° F. over temperature switch, wiring, pressure regulator, duct pressure transducer, dual duct pressure indicator, high stage regulator and leaky sense lines. As shown, component nodes generally have no predecessors or parents influencing them. The network fragment also includes nodes for the observed symptoms, such as the illumination of the bleed trip off light, failure of the bleed valve to close when the bleed switches are moved to an off position, duct pressure high when the engine is the bleed source, duct pressure low when the engine is the bleed source, duct pressure zero when the engine is the bleed source, failure of the isolation valve to open and duct pressure L and R pointers are not the same. Observation nodes, such as those representative of symptoms, typically have no successors or children to influence.

As will be recognized, that portion of the network fragment of FIG. 5 relating to the illumination of the bleed trip off light is derived from the information provided by the documents of FIG. 2-4. In this regard, the directional arrows pointing from the nodes representative of the high stage value and the other components to the node labeled "BLEED TRIP OFF Light On" indicates that the failure of any one of these components can cause the bleed trip off light to be illuminated. Although not shown in FIG. 5, the network model may also include a number of intermediate nodes interconnecting the parent nodes for the components and the child nodes for the observed symptoms. For example, the intermediate nodes could represent the failure state of a switch, valve, duct or the like, as described by U.S. Pat. No. 6,574,537. Based upon the failure state of a component, the intermediate nodes may interconnect the node(s) representing one or more components with the node(s) representing one or more of the observed symptoms in an acyclic manner. In this regard, Bayesian networks cannot function if a feedback loop (cycle) exists such that influence arcs can never be bidirectional and can, instead, only flow in one direction. As also described by U.S. Pat. No. 6,574,537, the network model may also include test nodes representative of tests to be conducted to refine the results of the diagnostic model.

The processor 12 also associates respective probabilities with the causal relationships between each symptom and the plurality of components whose failure may cause the respective symptom. The probability may be input, such as by an expert via the interface 16. For example, the processor may implement a questionnaire wizard in order to elicit the respective probabilities from the model builder, as described below. Alternatively, data defining the reliability of the various components may be stored in the memory device 14 or may otherwise be accessible by the processor so as to be utilized to define the respective probabilities. Regardless of the manner in which the probabilities are provided, the probabilities are associated with the various causal relationships between the symptoms and the components whose failure may cause a respective symptom such that the network model can prioritize the various potential causes of a symptom as described by U.S. Pat. No. 6,574,537.

Based upon the symptoms, the plurality of components, the causal relationships between the symptoms and the components as automatically identified from a review of the structured electronic representations of various documents, and the probabilities of the respective causal relationships, the processor 12 automatically constructs the network model. As described above, the components are generally parent nodes, and the symptoms are typically child nodes, with the causal relationships between the components and symptoms defining the influence arcs therebetween and probabilities preferably associated with respective ones of the causal relationships. Once constructed, an analysis of the Bayesian network model can identify one or more suspect components, such as one or more LRUs or lower level components within an LRU, that may have failed and caused an observed symptom(s). In addition, the probability that a suspect component failed and caused the observed symptom can be identified based upon the probability of failure of the node representing the suspect component and the probabilities associated with the respective states of any intermediate nodes that lead to the node representing the observed symptom. Accordingly, an analysis of the network model, such as by the processor in a manner described by U.S. Pat. No. 6,544,537 can identify the suspect components and a prioritized listing of the suspect components can be provided to guide further troubleshooting based upon the respective probabilities of failure of the suspect components.

Following the automated review of a plurality of documents and the automatic identification of symptoms, components and causal relationships therebetween, the processor 12 can drive the display 18 so as to present a representation of the plurality of components and symptoms. As shown in FIG. 6, for example, the display may provide a composite listing of the various components (designated Nodes or wiring) and the various symptoms (designated by a "FIM" prefix). Alternatively, the display can provide separate listings of the various components and the various symptoms, if desired. Further, the display can identify the possible states for the components and the symptoms. Various states are possible depending upon the type of component or symptom, although the display of FIG. 6 indicates that the possible states for the components are failed or normal and the possible states for the symptoms are on or off. The processor can also permit the selection of a number of functions by the model builder in order to further develop or otherwise modify the network model. As shown by means of a menu window overlaid on the listing of the components and symptoms in FIG. 7, the model builder can choose from several exemplary model building functions. Prior to choosing a model building function, the model builder will, via the interface 16, typically first select one of the components or symptoms by, for example, positioning the cursor upon the respective component or symptom and then clicking the mouse or other selection device. As such, the various functions identified by the menu window of FIG. 7 will then be performed, if selected by the model builder, relative to the selected component or symptom.

As shown in FIG. 7, for example, the model builder can select to locate the child/children of a selected component. If the model builder elects to locate the child/children of the selected component, those symptoms that may be caused by the failure of the selected component will be identified. By way of example, with respect to the portion of the network depicted in FIG. 5, the failure of the high stage valve may cause the illumination of the bleed trip off light, may cause the duct pressure to be low with the engine being the bleed source, or may cause the L & R pointers associated with the duct pressure not to be the same with the engine again being the bleed source.

Additionally, the model builder could select to add a child to a selected component. By adding a child, an additional influence arc is added to the network model connecting the selected component and a symptom that were not previously defined or recognized. Additionally, components may be added, deleted or renamed by the model builder.

The processor 12 may provide similar functions following the selection of a respective symptom as shown in FIG. 7. Instead of locating or adding children to a selected component, however, the parents of a selected symptom may be located or added in a comparable fashion. Likewise, symptoms may be added, deleted or renamed.

Additional functions provided by one embodiment of the present invention that are available to a model builder are depicted in FIG. 8. In this regard, the display of the components and the symptoms of the network model may also include functions that allow existing components and symptoms to be related or unrelated by the model builder. In the display of FIG. 8, for example, functions identified as "relate" and "unrelated" are provided to allow a selected component/symptom pair to be related as parent/child, or to sever a preexisting parent/child relationship, respectively. As such, new causal relationships may be defined and existing causal relationships may be extinguished, as desired by the model builder. In addition to again depicting the manner in which a component or symptom may be deleted, the display of FIG. 8 also illustrates that multiple components and/or symptoms may be merged, such as into a single node.

The apparatus 10 of this aspect of the present invention can provide a wide variety of other functions in addition to or instead of those described above. For example, the functioning type of a node may be changed, such as by changing a troubleshooting target (usually a component) to be an observable symptom (usually a FDE), or vice versa. Additionally, the nodes, including those representing the components and/or the symptoms, may be renamed, if desired.

The probability associated with the various causal relationships may also be elicited, as shown by the menu window of the display of FIG. 7. By selecting the "elicit probabilities" function, another display is presented, such as the display depicted by means of example in FIG. 9, which solicits the input of a probability to be associated with one or more causal relationships. The elicited probability may newly define the probability of a causal relationship that had not been previously established, or may redefine an existing probability. As shown in FIG. 9, a model builder is asked to provide the probability of the isolation valve not opening or closing properly if the bleed air isolation valve and the wiring have failed. In this example, the model builder has indicated that the probability is 0.5 or 50%. Thus, a model builder or other experts in the relevant field can quickly and efficiently input the probabilities associated with the various causal relationships in order to further define or refine the diagnostic network model.

Still further, the method and apparatus 10 of the present invention can provide additional information to a model builder or other user regarding a selected symptom. In this regard, a symptom may be selected and the "view document" function thereafter selected. Based upon the selection of the "view document" function, additional information regarding the selected symptom is provided. As shown in FIG. 10, for example, the additional information may include at least a portion of the structured document that originally formed the basis of the network model. As such, a model builder or other user can obtain a more detailed description of the symptom and the possible causes. By permitting the model builder or other user to obtain additional information relating to the selected symptom, the existing, highly evolved documentation is leveraged. Moreover, by basing the display of the additional information upon the selection of a respective symptom, the additional information that is relevant to the selected symptom may be provided, that is, the proper page(s) of the document may be displayed for ready review.

As mentioned above, the processor 12 generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

These computer program instructions may be loaded onto a computer or other programmable apparatus to produce a machine, such that the instructions, which execute on the computer or other programmable apparatus create means for implementing the above-described functions. These computer program instructions may also be stored in a computer-readable memory, such as memory device 14, that can direct a computer or other programmable apparatus to function in a particular manner, such that the instructions stored in the computer-readable memory produce an article of manufacture including instruction means which implement the functions of the present invention. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified above.

According to the present invention, a method, apparatus and computer program product are therefore provided for constructing a diagnostic network model based largely upon the definition of a complex system in terms of components, symptoms and the causal relationships therebetween, provided by various documents. By automatically constructing the diagnostic network model in this manner, the diagnostic network model can be constructed more efficiently, both in terms of time and expense, since experts need not be consulted as extensively. Additionally, since the construction of the diagnostic network model is based upon various documents, the documents may also be utilized to provide additional information regarding the various components and associated symptoms if requested by the user. Furthermore, this method, apparatus and computer program product provide an integrated environment and a standardized way to ensure consistent model construction as well as to support continuous model refinement.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for constructing a diagnostic network model comprising:
    automatically reviewing, with a processor, a structured electronic representation of each of a plurality of different types of documents, wherein automatically reviewing comprises automatically identifying at least one symptom, a plurality of components and causal relationships between a failure of the respective components and the occurrence of at least one symptom, wherein automatically identifying comprises mapping the failure of a respective component to at least one symptom to establish a respective causal relationship;
    associating respective probabilities, with the processor, with the causal relationships between the at least one symptom and the plurality of components whose failure contributes to the at least one symptom, wherein associating respective probabilities comprises obtaining respective probabilities from an individual participating in construction of the network model, and wherein obtaining respective probabilities from an individual comprises eliciting the probability associated with the causal relationship between at least one symptom and the failure of a respective component and receiving input from the individual of the elicited probability;
    automatically constructing, with the processor, the network model of the at least one symptom, the plurality of components, the causal relationships therebetween and the probabilities of the respective causal relationships; and
    displaying, with the processor, a representation of at least a portion of the network model.

2. A method according to claim 1 wherein the structured electronic representation of the document comprises a plurality of tags identifying respective fields including the at least one symptom and the plurality of components that are causally related to the at least one symptom, and wherein automatically reviewing the structured electronic representation of the document comprises automatically identifying the at least one symptom and the plurality of components that are causally related to the at least one symptom based, at least in part, upon the plurality of tags.

3. A method according to claim 1 wherein the structured electronic representation of the document comprises a markup language representation of the document, and wherein automatically reviewing the structured electronic representation of the document comprises automatically reviewing the markup language representation of the document.

4. A method according to claim 1 wherein associating the respective probabilities comprises at least one of receiving input defining at least some of the respective probabilities and retrieving at least some of the respective probabilities from a database.

5. A method according to claim 1 wherein automatically constructing the network model comprises automatically constructing a Bayesian network model of the at least one symptom, the plurality of components, the causal relationships therebetween and the probabilities of the respective causal relationships.

6. An apparatus for constructing a diagnostic network model comprising:
    a processor for automatically reviewing a structured electronic representation of each of a plurality of different types of documents including automatically identifying at least one symptom, a plurality of components and causal relationships between a failure of respective components and occurrence of the at least one symptom by mapping the failure of a respective component to at least one symptom to establish a respective causal relationship, wherein said processor also associates respective probabilities with the causal relationships between the at least one symptom and the plurality of components whose failure contributes to the at least one symptom, wherein the processor is configured to obtain respective probabilities from an individual participating in construction of the network model by eliciting the probability associated with the causal relationship between at least one symptom and the failure of a respective component and receiving input from the individual of the elicited probability, wherein said processor automatically constructs the network model of the at least one symptom, the plurality of components, the causal relationships therebetween and the probabilities of the respective causal relationships, and wherein the processor is configured to display a representation of at least a portion of the network model.

7. An apparatus according to claim 6 wherein the structured electronic representation of the document comprises a plurality of tags identifying respective fields including the at least one symptom and the plurality of the components that are causally related to the at least one symptom, and wherein said processor automatically identifies the at least one symptom and the plurality of components that are causally related to the at least one symptom based, at least in part, upon the plurality of tags.

8. An apparatus according to claim 6 further comprising at least one of an interface for permitting input of at least some of the respective probabilities and a memory device for storing some of the respective probabilities.

9. An apparatus according to claim 6 wherein said processor automatically constructs a Bayesian network model of the at least one symptom, the plurality of components, the causal relationships therebetween and the probabilities of the respective causal relationships.

10. A computer program product comprising a computer-readable storage medium having computer-readable program code portions stored therein that, when executed, cause a processor to perform respective functions, the computer-readable program portions comprising:
    a first processor-executable portion capable of reviewing a structured electronic representation of each of a plurality of different types of documents and of automatically identifying at least one symptom, a plurality of components and causal relationships between a failure of the respective components and the occurrence of the at least one symptom by mapping the failure of a respective component to at least one symptom to establish a respective causal relationship;
    a second processor-executable portion capable of receiving respective probabilities associated with the causal relationships between the at least one symptom and the plurality of components whose failure contributes to the at least one symptom, wherein the second executable portion is configured to receive respective probabilities from an individual participating in construction of the network model, and wherein the second executable portion is further configured to obtain respective probabilities from an individual by eliciting the probability associated with the causal relationship between at least one symptom and the failure of a respective component and receiving input from the individual of the elicited probability;

a third processor-executable portion capable of constructing a diagnostic network model of the at least one symptom, the plurality of components, the causal relationships therebetween and the probabilities of the respective causal relationships; and a fourth processor-executable portion configured to display a representation of at least a portion of the network model.

11. A computer program product according to claim 10 wherein the structured electronic representation of the document comprises a plurality of tags identifying respective fields including the at least one symptom and the plurality of components that are causally related to the at least one symptom, and wherein said first executable portion is capable of automatically identifying the at least one symptom and the plurality of components that are causally related to the at least one symptom based, at least in part, upon the plurality of tags.

12. A computer program product according to claim 10 wherein said second executable portion is capable of at least one of receiving input defining at least some of the respective probabilities and retrieving at least some of the respective probabilities from a database.

13. A computer program product according to claim 10 wherein said third executable portion is capable of constructing a Bayesian network model of the at least one symptom, the plurality of components, the causal relationships therebetween and the probabilities of the respective causal relationships.

14. A method comprising:
accessing, with a processor, at least a portion of a diagnostic network model that associates a plurality of components and symptoms based upon causal relationships therebetween, wherein the causal relationships associate a failure of respective components and occurrence of the at least one symptom;

associating, with the processor, a probability with the causal relationship between a symptom and a respective component whose failure contributes to the symptom, wherein associating a probability comprises providing the probability which was obtained from an individual participating in construction of the diagnostic network model;

displaying, with the processor, a representation of the plurality of components and symptoms including a plurality of parent nodes representative of the components, a plurality of child nodes representative of the symptoms and a plurality of influence arcs extending between respective parent and child nodes and associated with respective probabilities;

receiving a selection, with the processor, of at least one of the plurality of components and symptoms from among the plurality of components and symptoms that are displayed; and in response to the selection and with the processor, obtaining and displaying additional information related to the at least one of the components and symptoms that is selected.

15. A method according to claim 14 further comprising constructing the diagnostic network model comprising:
automatically reviewing a structured electronic representation of a document, wherein automatically reviewing comprises automatically identifying the plurality of symptoms and components and the causal relationships therebetween; and
automatically constructing the network model of the plurality of symptoms and components and the causal relationships therebetween.

16. A method according to claim 15 wherein displaying additional information comprises displaying at least a portion of the document.

17. A method according to claim 14 further comprising defining an additional causal relationship between a symptom and a respective component that have been selected.

18. A method according to claim 14 further comprising deleting a causal relationship between a symptom and a respective component that have been selected.

19. A method according to claim 14 further comprising displaying each symptom that is causally related to the failure of the at least one component that is selected.

20. A method according to claim 14 further comprising displaying each component whose failure is capable of causing the at least one symptom that is selected.

21. A computer program product comprising a non-transitory computer-readable storage medium having computer-readable program code portions stored therein that, when executed, cause a processor to perform respective functions, the computer-readable program portions comprising: a first processor-executable portion capable of accessing at least a portion of a diagnostic network model that associates a plurality of components and symptoms based upon causal relationships there between, wherein the causal relationships associate a failure of respective components and occurrence of the at least one symptom, and wherein the diagnostic model also associates a probability obtained from an individual participating in construction of the diagnostic network model with the causal relationship between a symptom and a respective component whose failure contributes to the symptom; a second processor-executable portion capable of displaying a representation of the plurality of components and symptoms including a plurality of parent nodes representative of the components, a plurality of child nodes representative of the symptoms and a plurality of influence arcs extending between respective parent and child nodes and associated with respective probabilities; a third processor-executable portion capable of receiving a selection of at least one of the plurality of components and symptoms from among the plurality of components and symptoms that are displayed; and a fourth processor-executable portion, responsive to the selection, capable of obtaining and displaying additional information related to the at least one of the components and symptoms that is selected.

22. A computer-program product according to claim 21 further comprising a fifth executable portion capable of constructing the diagnostic network model, wherein said fifth executable portion is further capable of automatically reviewing a structured electronic representation of a document to identify the plurality of symptoms and components and the causal relationships therebetween, and of automatically constructing the network model of the plurality of symptoms and components and the causal relationships therebetween.

23. A computer program product according to claim 22 wherein said fourth executable portion is capable of displaying at least a portion of the document.

* * * * *